US008554289B2

(12) United States Patent
Ogatsu

(10) Patent No.: US 8,554,289 B2
(45) Date of Patent: Oct. 8, 2013

(54) PORTABLE APPARATUS HAVING A SLIDE MECHANISM FOR AN UPPER CASING AND A LOWER CASING

(75) Inventor: Toshinobu Ogatsu, Tokyo (JP)

(73) Assignee: NEC Corporation, Tokyo (JP)

( * ) Notice: Subject to any disclaimer, the term of this patent is extended or adjusted under 35 U.S.C. 154(b) by 385 days.

(21) Appl. No.: 12/918,432

(22) PCT Filed: Feb. 20, 2009

(86) PCT No.: PCT/JP2009/053056
§ 371 (c)(1),
(2), (4) Date: Aug. 19, 2010

(87) PCT Pub. No.: WO2009/104747
PCT Pub. Date: Aug. 27, 2009

(65) Prior Publication Data
US 2011/0023637 A1  Feb. 3, 2011

(30) Foreign Application Priority Data
Feb. 22, 2008  (JP) ................................. 2008-041607

(51) Int. Cl.
*F16H 21/54* (2006.01)
(52) U.S. Cl.
USPC ..................................... 455/575.4; 455/575.1
(58) Field of Classification Search
USPC ............... 455/90.1–90.3, 550.1, 575.1–575.4
See application file for complete search history.

(56) References Cited

U.S. PATENT DOCUMENTS

| 7,542,788 | B2 | 6/2009 | Lee |
| 7,831,285 | B2 | 11/2010 | Lee |
| 7,869,844 | B2 | 1/2011 | Lee et al. |
| 2008/0146297 | A1* | 6/2008 | Ho ............................ 455/575.4 |

FOREIGN PATENT DOCUMENTS

| JP | 2004253526 A | 9/2004 |
| JP | 2005286994 A | 10/2005 |
| JP | 2006031107 A | 3/2006 |
| JP | 2006108881 A | 4/2006 |
| JP | 2008-501288 A | 1/2008 |

(Continued)

OTHER PUBLICATIONS

International Search Report for PCT/JP2009/053056 mailed Apr. 7, 2009.

(Continued)

*Primary Examiner* — Sam Bhattacharya

(57) ABSTRACT

A portable apparatus, having a slide mechanism by which an upper casing can be made to slide with respect to a lower casing, comprises: an assist mechanism, disposed between the upper casing and the lower casing, and assisting sliding of the upper casing. The assist mechanism comprises: a first support member attached pivotably to the upper casing or to a member fixed to the upper casing; a second support member attached pivotably to the lower casing or to a member fixed to the lower casing; at least one first elastic spring biasing the first support member; at least one second elastic spring biasing the second support member; and a holding case that holds the first and second elastic springs in a serially arrayed state with a direction of extension and contraction of the first elastic spring forming a prescribed angle to that of the second elastic spring, the first support member being slidably inserted in the direction of the first elastic spring, and the second support member being slidably inserted in the direction of the second elastic spring.

8 Claims, 12 Drawing Sheets

(FIRST EXAMPLE)

(56) References Cited

FOREIGN PATENT DOCUMENTS

| | | | |
|---|---|---|---|
| JP | 2008-502175 | A | 1/2008 |
| JP | 2008-506299 | A | 2/2008 |
| WO | 2006006776 | A | 1/2006 |

OTHER PUBLICATIONS

Japanese Office Action for JP2009-554401 mailed on May 28, 2013 with English Translation.

* cited by examiner

FIG. 1 (FIRST EXAMPLE)

FIG. 3 (FIRST EXAMPLE)

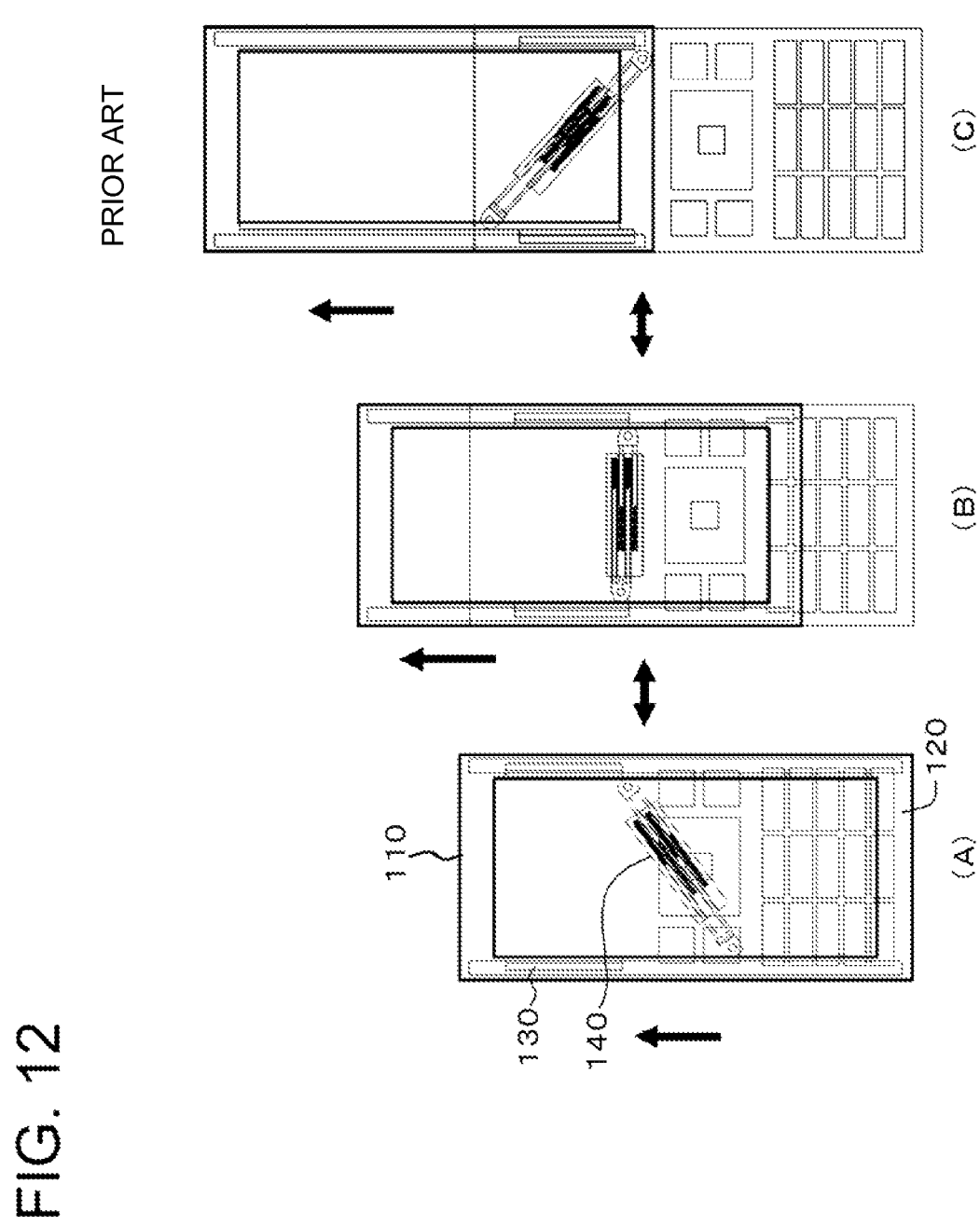

PORTABLE APPARATUS HAVING A SLIDE MECHANISM FOR AN UPPER CASING AND A LOWER CASING

CROSS-REFERENCE TO RELATED APPLICATION

The present invention is the National Phase of PCT/JP2009/053056, filed Feb. 20, 2009, which is based upon and claims the benefit of the priority of Japanese Patent Application No. 2008-041607 (filed on Feb. 22, 2008), the disclosure of which is incorporated herein in its entirety by reference thereto.

TECHNICAL FIELD

The present invention relates to a portable apparatus such as a mobile telephone, a digital camera, an electronic notebook, or the like, and in particular relates to a portable apparatus having a slide mechanism by which an upper casing can slide with respect to a lower casing.

BACKGROUND

In recent years, with regard to mobile telephones, together with portability when mobile, usage purposes include not only speaking but also have spread widely to include transmission and reception of electronic mail, internet connectivity, game functionality, and the like. As a result, in order to combine large screen display devices with operability for text input and the like, mobile telephones are being provided with various types of mechanisms.

For example, foldable mobile telephones are normally carried in a state with an upper casing and a lower casing folded, and by having the telephone in an open state when speaking or transmitting mail, various types of operation are possible by exposing a large screen display part and an operation part. With a foldable mobile telephone, it is possible to prevent mistaken operations when carrying by bringing together the display face and operation face when the telephone is folded, but on the other hand most operations cannot be done since the display face is not exposed when folded. As a result, there is a case where a small sized display part is separately provided with which it is possible to make confirmations in a folded state.

On the other hand, with a sliding type of mobile telephone, the display part is always exposed irrespective of whether the telephone is stored away or is extended, so that it is possible to check the display part in any state. For example, referring to FIG. 9, by providing a minimum key operation part 112 in a portion below the display part 111 in an upper casing 110, since the display part 111 is in an exposed state even when stored away, that is, when being carried, certain operations are possible in this state as it is, such as reading electronic mail and performing Internet operations, and convenience is improved. When performing operations such as creating a mail text, by sliding the upper casing 110 and the lower casing 120 in parallel, a key operation part 121 of the lower casing 120 hidden under the upper casing 110 is exposed and operations are possible. At this time, sliding operations are often performed manually, but in order to improve operability and operational feel, an assist mechanism supporting manual operation may be added to the slide mechanism. In such a case, since there is a necessity to generate a holding force at two positions, which are in an open state and in a closed state, in order to realize this simply, a spring may be configured in which load direction changes at an intermediate position. In general a compression spring or a spiral spring is used, and a mechanism that reverses load direction at an intermediate position is well known.

As a slide type mobile telephone having an assist mechanism in a slide mechanism, Patent Document 1, for example, discloses a configuration that uses an elastic force when a coil spring transforms into a U-shape, and a load direction at an intermediate position changes when a lower plate and an upper plate are made to slide. Patent Document 2 discloses a configuration having an intermediate portion that is wound and a coil shaped portion as an apex, to have a coil spring of an inverted V-shape with ends connected at left and right, and an expanding angular biasing force is used such that left and right connected ends of the coil spring tend to mutually separate, and a load direction changes at an intermediate position when a first member and a second member are made to slide. Patent Document 3 discloses a configuration that uses a peripheral direction biasing force of a spring so that load direction changes at an intermediate position when a first casing and a second casing are made to slide.

[Patent Document 1] JP Patent Kokai Publication No. JP-P2005-286994A

[Patent Document 2] JP Patent Kokai Publication No. JP-P2004-253526A

[Patent Document 3] JP Patent Kokai Publication No. JP-P2006-108881A

SUMMARY

Each of disclosed matters of the abovementioned Patent Documents 1 to 3 is incorporated herein by reference thereto. The following analysis is given on related technology according to the present invention.

There are several problems, however, in an assist mechanism of a slide mechanism as disclosed in Patent Documents 1 to 3.

A first problem is that, by configuring the assist mechanism by a spring, since the spring moves to a large extent by extension and contraction of a casing, the volume occupied by structural parts and spatial volume associated with movement occupies a large volume inside a portable apparatus. In the assist mechanism 140 of a compression spring form shown in FIG. 10 and FIG. 11, compression springs 144 and 145 generate a load acting in a diagonally downward direction at an angle of 45° in a contraction state (refer to (A) of FIG. 12); when an intermediate point (refer to (B) of FIG. 12) is passed, in a manual operation, and the acting load reverses, automatically extends, and is stopped by a stopper, not shown in the drawings, at a position of approximately 45° in a diagonally upward direction (refer to (C) of FIG. 12). At this time, in addition to volume occupied by the compression springs 144 and 145 and other structural members (a holding case 141, and slide support units 142 and 143), spatial volume associated with movement, with a shape similar to a triangle, is necessary. Above and below, small triangular shaped spaces remain, but in electronic devices such as a portable apparatus or the like, since other parts generally have a quadrangular shape or a round shape, a triangular shape is difficult to use effectively and becomes a region that is non-usable. As a result, in order to realize this type of assist structure, the volume occupied by the structural members and the spatial volume associated with movement, and in addition the non-usable regions occurring due to the spatial volume associated with movement, become necessary, and largely impede miniaturization of the device.

A second problem is the point that, for a configuration in which the assist structure is installed inside a sliding mechanism unit, with miniaturization, it is not possible to ensure a stroke at a time of extension. Patent Document 1 refers to a general slide type mobile telephone, but it is assumed that, with regard to an external view of the device, there is no exposure when an assist mechanism is extended, and giving consideration to the fact that a load direction transformation position of the assist mechanism is taken at the center of the stroke, half the amount of the slide stroke must be contained in a portion overlapped by a cover part (upper-lower casing) at a time of extension. That is, if the stroke length is 50 mm, 25 mm or more must be contained in the overlapping portion of the cover part (upper-lower casting). Meanwhile, for a flexible cable connecting the cover part (upper-lower casings), since a return position moves half the stroke length, a region of 25 mm or more must be ensured. In a case where consideration is given to making devices thin, if volume is increased in the direction of thickness of these mechanisms, the device thickness increases, so that an arrangement on the same planar face is desirable, but in order to have this, an overlapping portion of the cover part (upper-lower casings) requires at least 50 mm for a 50 mm slide stroke, so that as a result the device length is 100 mm or more. If consideration is given to a configuration of an attaching part and to size of parts configuring the assist mechanism, for a casing of a total length of 100 mm, the stroke cannot be ensured with 50 mm.

A third problem is the point that making the assist mechanism thin is difficult. In a case of a coil spring of an inverted V-shape disclosed in Patent Document 2, with double the thickness for minimum wire diameter being part structure thickness, additionally, since a central axis of the spring bending load, added above and below the coil shaped part, is shifted, flexure occurs while deforming with respect to the central axis. As a result, it is necessary to ensure a larger space than the part structure thickness and avoid contact with members (casings) above and below, or to allow but restrict contact with members (casings) above and below. If contact is made a frictional noise and damage may occur, causing a deterioration in feeling. Furthermore, in a case of using a spring disclosed in Patent Document 3, since there is flexure due to self weight whether a steel strip is wound or a wire is wound, it is necessary to select either ensuring a space similar to the coil spring of the inverted V-shape and avoid putting the upper and lower casings in contact, or putting them in contact and pressing down. In either case, it is difficult to have a thin structure while maintaining feel.

A fourth problem is the point that it is not possible to realize both durability and to have a thin structure. In a case of the coil spring of the inverted V-shape as in Patent Document 2, if it is attempted to decrease strain amount in order to lengthen operating life of the spring, it is necessary to increase the number of windings or to enlarge the diameter of the coil shaped portion, but this has an adverse effect for maintaining a constant retention force. Therefore, in order to take a countermeasure of thickening wire diameter to increase a generative force, if consideration is given to the retention force and the operating life, making the structure thin becomes difficult.

It is a principal object of the present invention to realize, for an assist mechanism of a slide mechanism of a portable apparatus, a structure that is small and has high strength, and that enables a large stoke length and a small and thin shape.

In a first aspect of the present invention, a portable apparatus, having a slide mechanism by which an upper casing can be made to slide with respect to a lower casing, is provided with an assist mechanism, disposed between the upper casing and the lower casing and assisting sliding of the upper casing, wherein the assist mechanism is provided with: a first support member attached pivotably to the upper casing or to a member that is fixed to the upper casing; a second support member attached pivotably to the lower casing or to a member that is fixed to the lower casing; one or a plurality of first elastic springs that bias the first support member; one or a plurality of second elastic springs that bias the second support member; and a holding case that holds the first elastic spring and the second elastic spring(s) in a serially arrayed state with a direction of extension and contraction of the first elastic spring(s) forming a prescribed angle to a direction of extension and contraction of the second elastic spring, the first support member being slidably inserted in the direction of extension and contraction of the first elastic spring(s), and the second support member being slidably inserted in the direction of extension and contraction of the second elastic spring(s).

According to the present invention the following effects are realized.

A first effect is that since a region through which the assist mechanism passes has an approximately quadrangular shape, it is possible to arrange parts outside a region of the spatial volume associated with movement of the assist mechanism. As a result, it is possible to eliminate non-usable regions or to get by with an extremely small non-usable region, and space can be utilized to the maximum.

A second effect is the point that the flexible cable for connecting the upper and lower casings can be also disposed in the same plane. From this, it is possible to have a thin device.

A third effect is the point that, since compression springs that have a large spring stroke are used, it is possible both to ensure durability and to have a large stroke, and in addition a thin device is possible.

A fourth effect is that, as a result of the first to the third effects, it is possible to realize a slide assist mechanism that has both a large stroke and that enables a small sized and thin device.

BRIEF DESCRIPTION OF THE DRAWINGS

FIG. 12 is a drawing for describing a sliding operation of the portable apparatus according to a conventional example.

Figure 1:
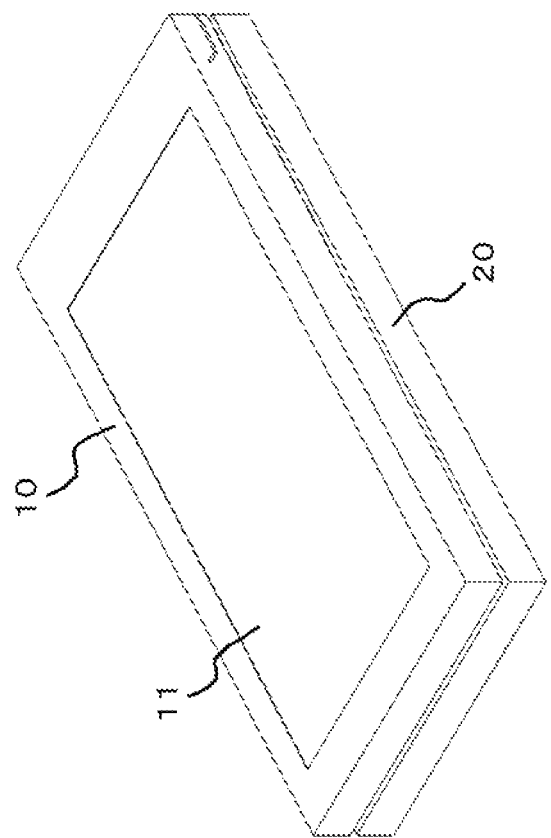
FIG. 1 is an external perspective view schematically showing a configuration of a portable apparatus according to a first example of the present invention, when the apparatus is shut away.

As for explanation of symbols, refer to the end of the specification.

PREFERRED MODES

In an exemplary embodiment of the present invention, a portable apparatus, having a slide mechanism (30 and 31 in FIG. 3) by which an upper casing (10 in FIG. 3) can be made to slide with respect to a lower casing (20 in FIG. 3), is provided with an assist mechanism (40 in FIG. 3) disposed between the upper casing (10 in FIG. 3) and the lower casing (20 in FIG. 3) and assisting sliding of the upper casing (10 in FIG. 3), wherein the assist mechanism (40 in FIG. 4) is provided with: a first support member (44 in FIG. 4) attached rotatably (pivotably) to the upper casing (10 in FIG. 3) or to a member (31 in FIG. 3) that is fixed to the upper casing (10 in FIG. 3), a second support member (45 in FIG. 4) attached pivotably to the lower casing (20 in FIG. 3) or to a member (30 in FIG. 3) that is fixed to the lower casing (20 in FIG. 3), one or a plurality of first elastic springs (42 in FIG. 4) that bias the first support member (44 in FIG. 4), one or a plurality of second elastic springs (43 in FIG. 4) that bias the second support member (45 in FIG. 4), and a holding case (41 in FIG. 4) that holds the first elastic springs (42 in FIG. 4) and the second elastic springs (43 in FIG. 4) in a serially arrayed state with a direction of extension and contraction of the first elastic spring(s) (42 in FIG. 4) and a direction of extension and contraction of the second elastic spring(s) (43 in FIG. 4) forming a prescribed angle, and wherein the first support member (44 in FIG. 4) is slidably inserted in the direction of extension and contraction of the first elastic spring(s) (42 in FIG. 4), and the second support member (45 in FIG. 4) is slidably inserted in the direction of extension and contraction of the second elastic spring(s) (43 in FIG. 4) (mode 1).

In addition the following mode is also possible.

The first elastic spring(s) and the second elastic spring(s) are preferably coil springs (mode 1-1).

The prescribed angle is preferably 90° (mode 1-2).

A flexible cable is preferably provided, being disposed so as not to interfere with the assist mechanism between the lower casing and the upper casing where the assist mechanism is arranged, and also electrically connecting an electrical part inside the upper casing and an electrical part inside the lower casing (mode 1-3).

The holding case is preferably configured to hold abreast and in parallel a plurality of first elastic springs, and also to hold abreast and in parallel a plurality of second elastic springs (mode 1-4).

The holding case preferably has a guide mechanism that guides movement of the assist mechanism when the upper casing slides, at an intersection point of load force lines of the first elastic spring(s) and the second elastic spring(s) (mode 1-5).

FIRST EXAMPLE

Figure 2:
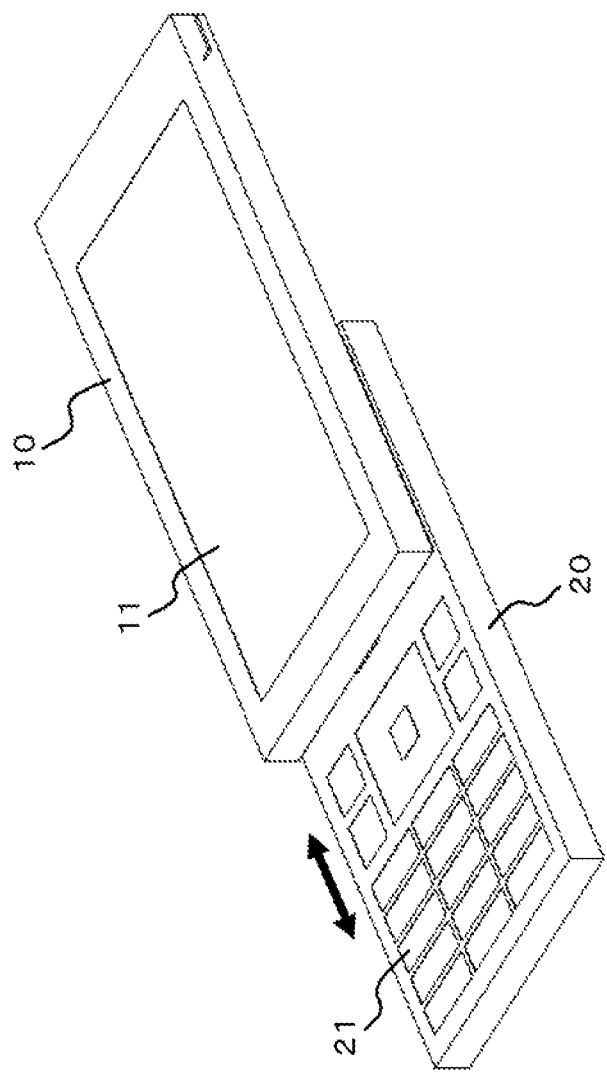
FIG. 2 is an external perspective view schematically showing a configuration of the portable apparatus according to the first example of the present invention, when the apparatus is extended.
Figure 3:
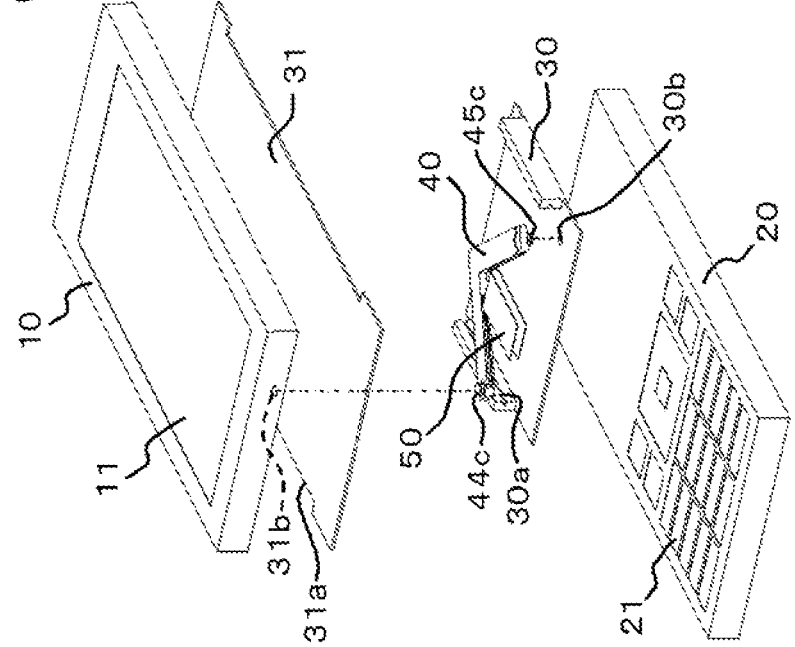
FIG. 3 is an expanded perspective view of a slide mechanism portion of the portable apparatus according to the first example of the present invention.
Figure 4:
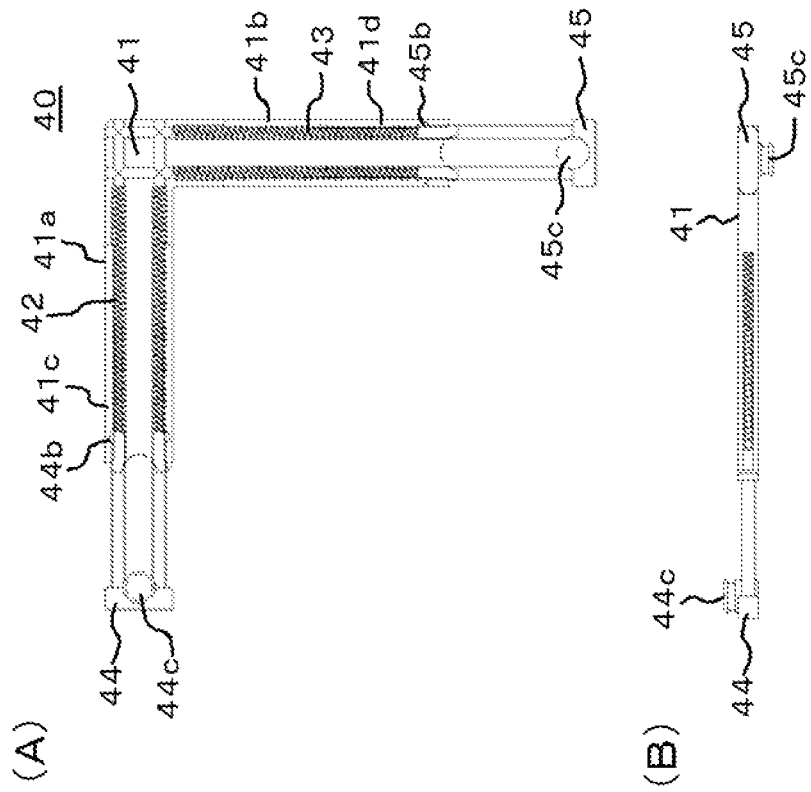
FIG. 4 is schematically showing a configuration of an assist mechanism in the portable apparatus according to the first example of the present invention: (A): plan view; (B): side view.
Figure 5:
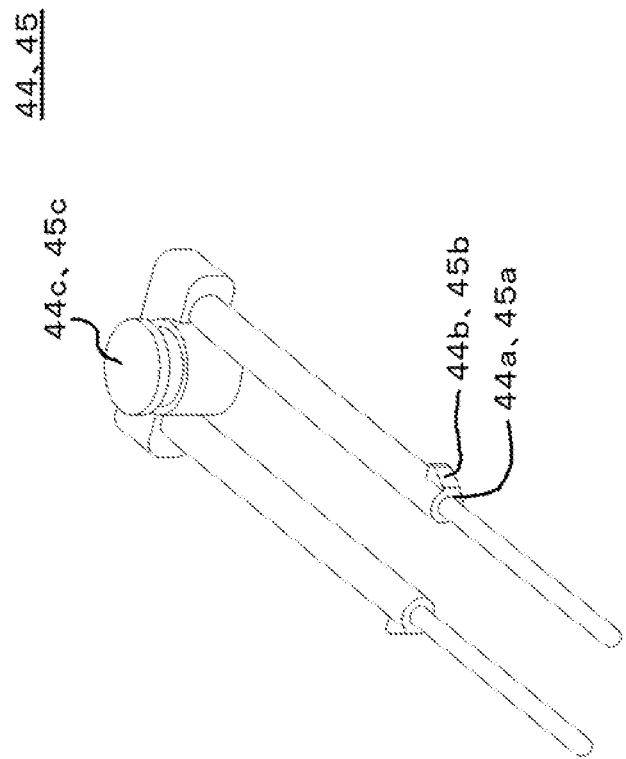
FIG. 5 is a perspective view schematically showing a configuration of a compression support part of the assist mechanism in the portable apparatus according to the first example of the present invention.
Figure 6:
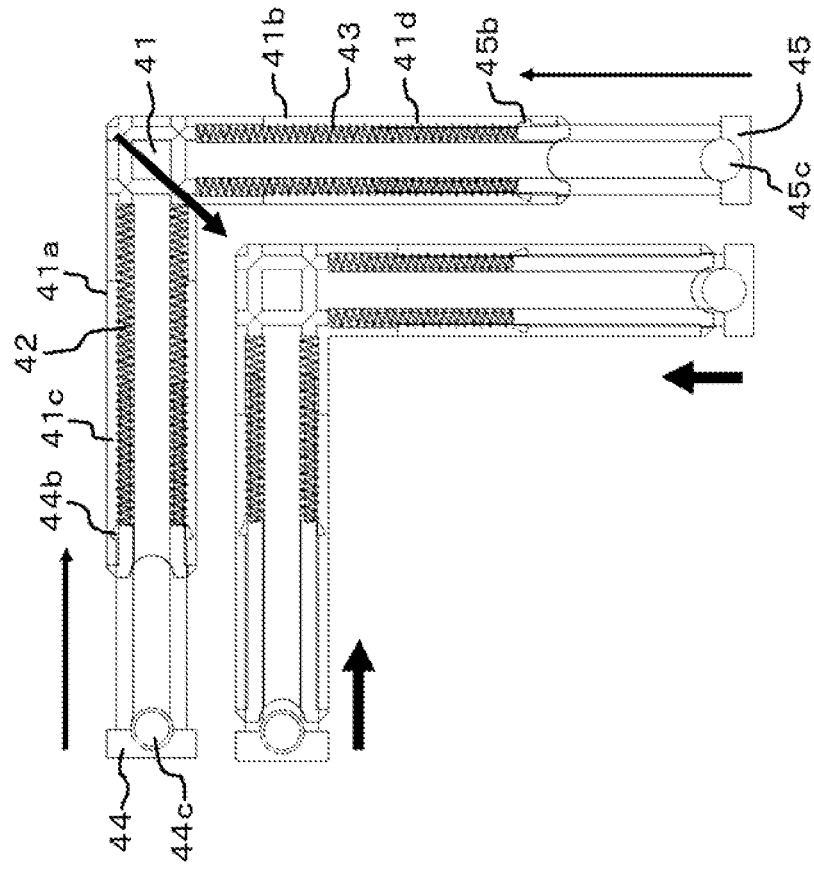
FIG. 6 is a plan view schematically showing operation of the assist mechanism in the portable apparatus according to the first example of the present invention.

A description is given concerning a portable apparatus according to a first example of the present invention, using the drawings. FIG. 1 is an external perspective view schematically showing a configuration of the portable apparatus according to the first example of the present invention, when the apparatus is shut away. FIG. 2 is an external perspective view schematically showing a configuration of the portable apparatus according to the first example of the present invention, when the apparatus is extended. FIG. 3 is an expanded perspective view of a slide mechanism portion of the portable apparatus according to the first example of the present invention. (A) of FIG. 4 is a plan view and (B) of FIG. 4 is a side view schematically showing a configuration of an assist mechanism in the portable apparatus according to the first example of the present invention. FIG. 5 is a perspective view schematically showing a configuration of a compression support part of the assist mechanism in the portable apparatus according to the first example of the present invention. FIG. 6 is a plan view schematically showing operation of the assist mechanism in the portable apparatus according to the first example of the present invention.

The portable apparatus is a device that is portable, such as a mobile telephone, a digital camera, an electronic notebook, or the like, and in FIG. 1 and FIG. 2 it is a mobile telephone. The portable apparatus is configured such that the upper casing 10 and the lower casing 20 are slidable. The upper casing 10 has a display part 11 on a face opposite to a face of the lower casing 20 side. The lower casing 20 has a key operation part 21 on a face on the upper casing 10 side. When the portable apparatus is shut away, the upper casing 10 and the lower casing 20 completely overlap, the key operation part 21 is covered by the upper casing 10 (refer to FIG. 1), and when extended the key operation part 21 is exposed. In a portion connecting the upper casing 10 and the lower casing 20, the portable apparatus has slide mechanisms 30 and 31, an assist mechanism 40, and a flexible cable 50 (refer to FIG. 3).

The slide mechanisms 30 and 31 are mechanisms for enabling the upper casing 10 to slide with respect to the lower casing 20 (refer to FIG. 3).

The slide mechanism 30 is a part that is fixed to the lower casing 20 (refer to FIG. 3). The slide mechanism 30 has a groove portion 30a that guides sliding of a slide part 31a of the slide mechanism 31, inside of portions that protrude to the left and right. The slide mechanism 30 has a hole 30b for pivotably attaching an attachment support part 45c of the assist mechanism 40, at a prescribed position of a plate face attached to the lower casing 20.

The slide mechanism 31 is a part that is fixed to the upper casing 10 (refer to FIG. 3). The slide mechanism 31 has the slide part 31a inserted into the groove portion 30a of the slide mechanism 30, on edges of both left and right sides, enabling sliding with a prescribed stroke width (length). The slide mechanism 31 has a hole 31b for pivotably attaching an attachment support part 44c of the assist mechanism 40, at a prescribed position of a plate face attached to the upper casing 10.

A flexile cable 50 is a flexible wiring cable that electrically connects an electrical part (not shown in the drawings) inside the upper casing 10 and an electrical part (not shown in the drawings) inside the lower casing 20 (refer to FIG. 3). The flexible cable 50 is disposed so as not to interfere with the assist mechanism 40 between the slide mechanisms 30 and 31 where the assist mechanism 40 is arranged (between the upper casing 10 and the lower casing 20).

The assist mechanism 40 is a mechanism that utilizes a biasing force of the compression springs 42 and 43 to assist a sliding operation of the slide mechanisms 30 and 31 by a manual operation (refer to FIG. 3). The assist mechanism 40 operates so as not to interfere with the flexible cable 50 between the slide mechanisms 30 and 31. The assist mechanism 40 has a holding case 41, first compression springs 42, second compression springs 43, a first compression support member 44, and a second compression support member 45 (refer to FIG. 4).

The holding case 41 is an L-shaped case that houses and holds the compression springs 42 and 43 (refer to FIG. 4). The holding case 41 has a first compression spring housing part 41a that houses the first compression springs 42 in a portion in one direction of extension. The first compression spring housing part 41a, into which the first compression support member 44 is inserted from an extremity such that sliding is possible, has a stopper groove portion 41c that guides sliding in a prescribed range, with regard to a retaining clasp (pawl) 44b of the first compression support member 44. The holding case 41 has a second compression spring housing part 41b that houses the second compression springs 43 in a portion in the other direction of extension. The second compression spring housing part 41b, into which the second compression support member 45 is inserted from an extremity such that sliding is possible, has a stopper groove portion 41d that guides sliding in a prescribed range, with regard to a retaining clasp (pawl) 45b of the second compression support member 45.

The holding case 41 has a structure such that the compression spring housing parts 41a and 41b form a prescribed angle and are connected serially. The compression spring housing parts 41a and 41b are configured to be left-right symmetric. With regard to an orthogonal point where the compression springs 42 and 43, which are in a series inside the holding case 41, are orthogonal to each other, in a case of a left-right symmetrical form with the orthogonal point as a border, movement takes place at an incline of 45°. Matching this movement locus, by forming a groove portion 30a in a slide mechanism 30 fixed to the lower casing 20 as shown in FIG. 3, and configuring the groove portion 30a so that the orthogonal point of the holding case 41 moves inside the groove portion 30a, the first compression spring and the second compression spring always have an identical amount of flexure, so that operational defects due to friction of the compression support members 44 and 45 and the compression spring housing parts 41a and 41b of the holding case 41, are eliminated.

In FIG. 4, the compression spring housing parts 41a and 41b are serially connected at an angle of 90°, but the angle need not be 90° and may be larger or smaller than that. However, in order to have both a large stroke and a small sized and thin device, the angle is desirably in a range of greater than or equal to 45° and less than or equal to 135°. Furthermore, with an angle of 90° or less, the sliding stroke becomes small, but this contributes to improvement in operational feel and miniaturization. On the other hand, with an angle larger than 90°, spatial volume associated with movement of the assist mechanism 40 increases, but lateral load added to the compression support members 44 and 45 and the compression spring housing parts 41a and 41b can be reduced, so that smooth operation becomes possible without strictly managing part dimensions.

The holding case 41 may have a guide mechanism (not shown in the drawings) that guides movement of the assist mechanism 20 when the upper casing 10 slides, at an intersection point of load force lines of the first compression spring(s) 42 and the second compression spring(s) 43.

The first compression springs 42 are housed such that extension and contraction are possible inside the first compression spring housing part 41a of the holding case 41; the first compression springs 42 are an elastic spring that biases the first compression support member 44 towards an extremity of the first compression spring housing part 41a, and it is possible to use a coil spring (refer to FIG. 4 and FIG. 6). One end of the first compression spring(s) 42 is supported at a side wall of the holding case 41, and the other end is supported at a compression spring push-in step portion (44a in FIG. 5) of the first compression support member 44.

The second compression springs 43 are housed such that extension and contraction are possible inside the second compression spring housing part 41b of the holding case 41; the second compression spring(s) 43 is an elastic spring that biases the second compression support member 45 towards an extremity of the second compression spring housing part 41b, and it is possible to use a coil spring (refer to FIG. 4 and FIG. 6). One end of the second compression spring(s) 43 is supported at a side wall of the holding case 41, and the other end is supported at a compression spring push-in step portion (45a in FIG. 5) of the second compression support member 45.

The first compression support member 44 is inserted slidably into the first compression spring housing part 41a from an extremity of the first compression spring housing part 41a of the holding case 41, and is a member that supports the other end of the first compression springs 42 (extremity of the first compression spring housing part 41a) (refer to FIG. 4). The first compression support member 44 has the compression spring push-in step portion 44a for receiving a biasing force of the first compression spring 42 (refer to FIG. 4 to FIG. 6). The first compression support member 44 has a stopper clamp (pawl) 44b that can slide inside a stopper groove portion 41c of the holding case 41. The first compression support member 44 has an attachment support part 44c that is pivotably attached to the hole 31b of the slide mechanism 31 (the upper casing 10 is also possible) at a portion extending outside the holding case 41 (refer to FIG. 3 to FIG. 5).

The second compression support member 45 is inserted slidably into the second compression spring housing part 41b from an extremity of the second compression spring housing part 41b of the holding case 41, and is a member that supports the other end of the second compression springs 43 (extremity of the second compression spring housing part 41b) (refer to FIG. 4). The second compression support member 45 has the compression spring push-in step portion 45a for receiving a biasing force of the second compression springs 43 (refer to FIG. 4 to FIG. 6). The second compression support member 45 has a stopper clamp (pawl) 45b that can slide inside a stopper groove portion 41d of the holding case 41. The second compression support member 45 has an attachment support part 45c that is pivotably attached to the hole 30b of the slide mechanism 30 (the lower casing 20 is also possible) at a portion extending outside the holding case 41 (refer to FIG. 3 to FIG. 5).

Figure 7:
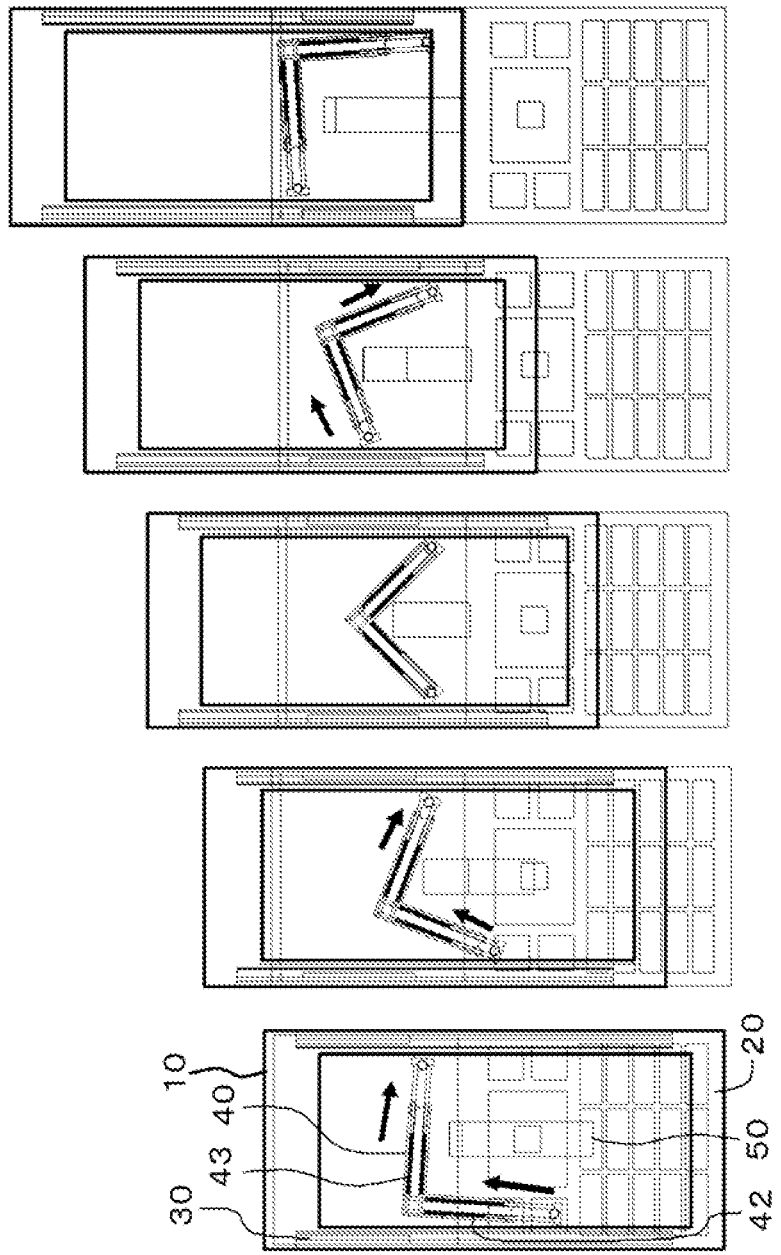
FIG. 7 is a first view for describing a sliding operation of the portable apparatus according to the first example of the present invention.
Figure 8:
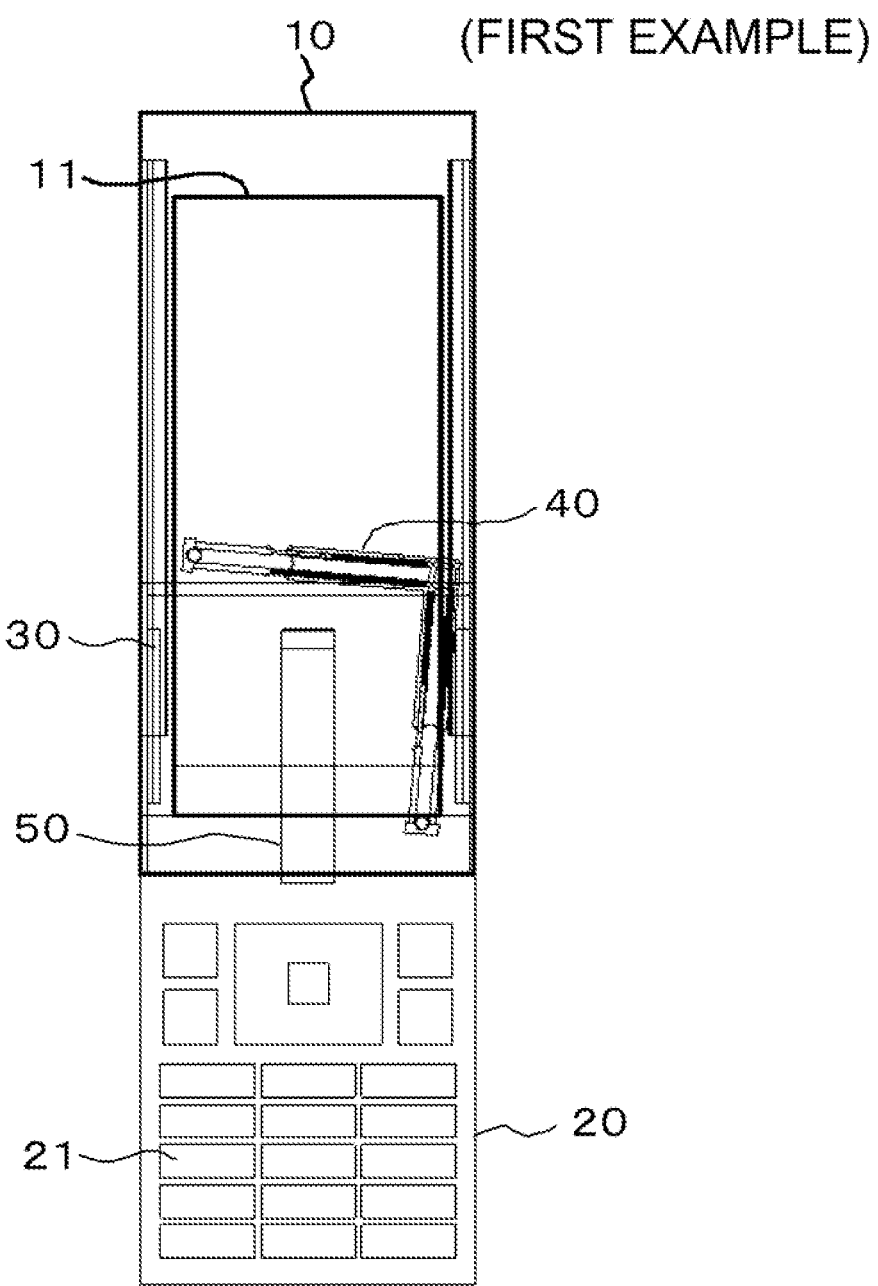
FIG. 8 is a second view for describing a sliding operation of the portable apparatus according to the first example of the present invention.
Figure 9:
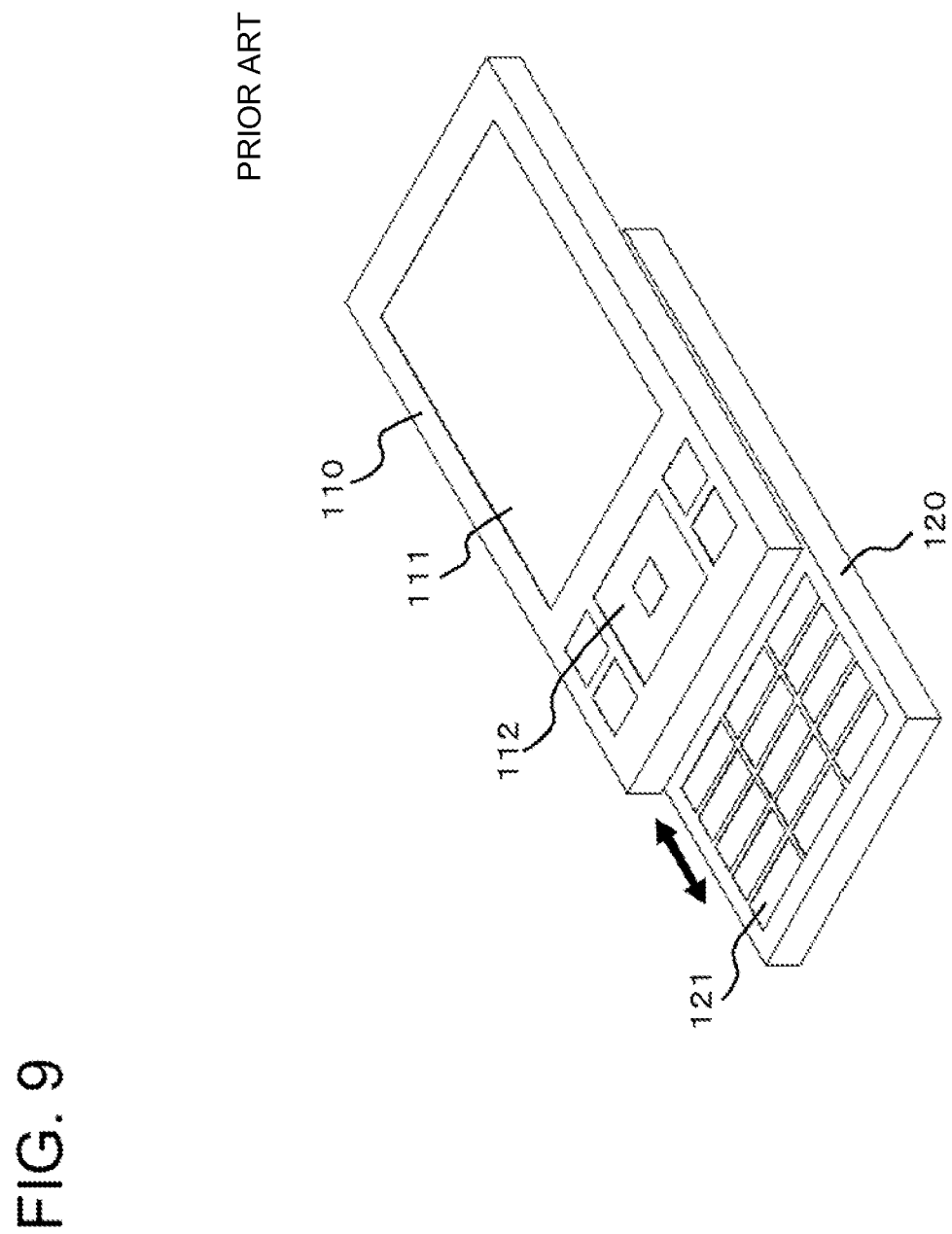
FIG. 9 is an external perspective view schematically showing a configuration of the portable apparatus according to a conventional example, when the apparatus is extended.
Figure 10:
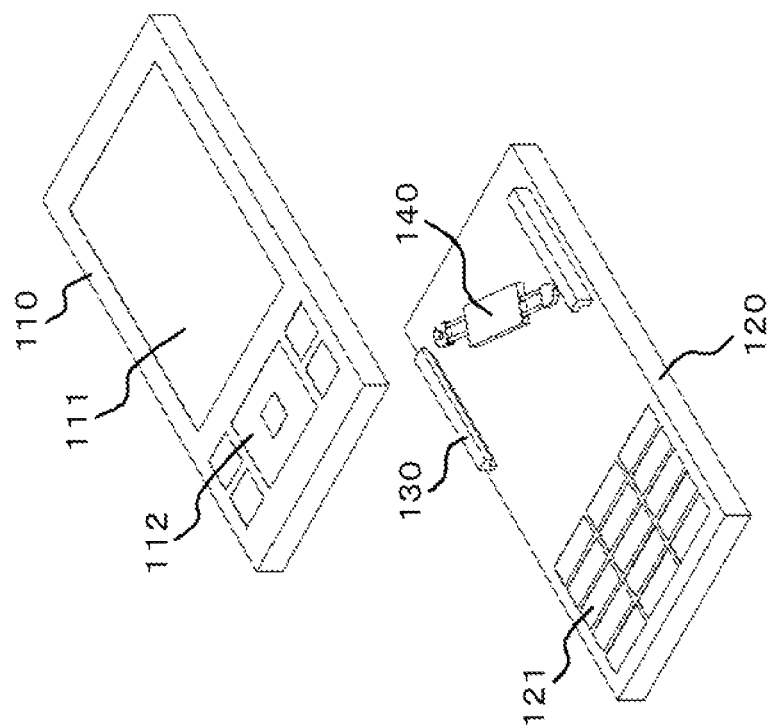
FIG. 10 is an expanded perspective view of a slide mechanism portion of the portable apparatus according to a conventional example.

Next, a description is given concerning a sliding operation of the portable apparatus according to the first example of the present invention, using the drawings. FIG. 7 and FIG. 8 are drawings for describing the sliding operation of the portable apparatus according to the first example of the present invention.

Referring to FIG. 7, in a case where the upper casing 10 is made to slide with respect to the lower casing 20 as in (A) to (E) of FIG. 7, since the assist mechanism 40 has an L-shape and the first compression springs 42 and the second compression springs 43 are connected serially, the spatial volume associated with movement of the assist mechanism 40 can have a quadrangular shape.

In a contraction state (refer to (A) of FIG. 7), a retaining force is generated mainly by the first compression springs 42.

At this time, a compression load is similarly generated in the second compression springs 43, but since the direction of operation is in principal approximately perpendicular to the direction of sliding, there is no operation for holding positions of the upper and lower casings 10 and 20. A reaction force of B against A, and A against B, is generated in a direction perpendicular to respective spring load generation directions of both the compression springs 42 and 43. As a result, a lateral load acts via the compression support members (44 and 45 in FIG. 4) on the compression spring housing parts (41*a* and 41*b* in FIG. 4) of the holding case (41 in FIG. 4). In particular, since a large lateral load is added also at a time of extension, it is necessary to have a high rigidity of the attachment support parts (44*c* and 45*c* in FIG. 4) of the compression support members (44 and 45 in FIG. 4), and in order to realize a smooth sliding operation it is necessary to ensure slidability between the compression support members (44 and 45 in FIG. 4) and the compression spring housing parts (41*a* and 41*b* in FIG. 4). Here, in order to restrain rattle to a minimum, a gap between the compression support members (44 and 45 in FIG. 4) and the compression spring housing parts (41*a* and 41*b* in FIG. 4) is controlled approximately to 5-50 μm; and for material quality of the compression support members (44 and 45 in FIG. 4) and the compression spring housing parts (41*a* and 41*b* in FIG. 4), engineering plastic having a high strength slidability grade, or metallic material to which slidable coating such as a fluoride coating or the like is applied, is employed.

When the upper casing 10 is manually made to slide from (A) of FIG. 7 towards the top of the drawing, the first compression springs 42 are pushed as in (B) of FIG. 7 and at the same time the second compression springs 43 are also pushed and compressed. When manually pushed upwards as far as a position in (C) of FIG. 7, the load direction reverses, and thus finally the configuration moves automatically via (D) FIG. 7 and (E) FIG. 7 to FIG. 8. In this state, a force is generated so that the upper casing 10 does not move down from an extended position mainly by the second compression springs 43. From (A) to (E) of FIG. 7 and FIG. 8, it is understood that the region in which the assist mechanism 40 moves is close to a quadrangular shape. As a result, it is possible to effectively use outside an occupied spatial volume associated with movement of the assist mechanism (140 in FIG. 12) that is essentially a non-usable region in a conventional example (refer to FIG. 12). For example, with the flexible cable (50 in FIG. 3), since the cable moves along with movement of the assist mechanism 40, it is possible to dispose the cable in the same plane without contact or interference with the assist mechanism 40.

Figure 11:
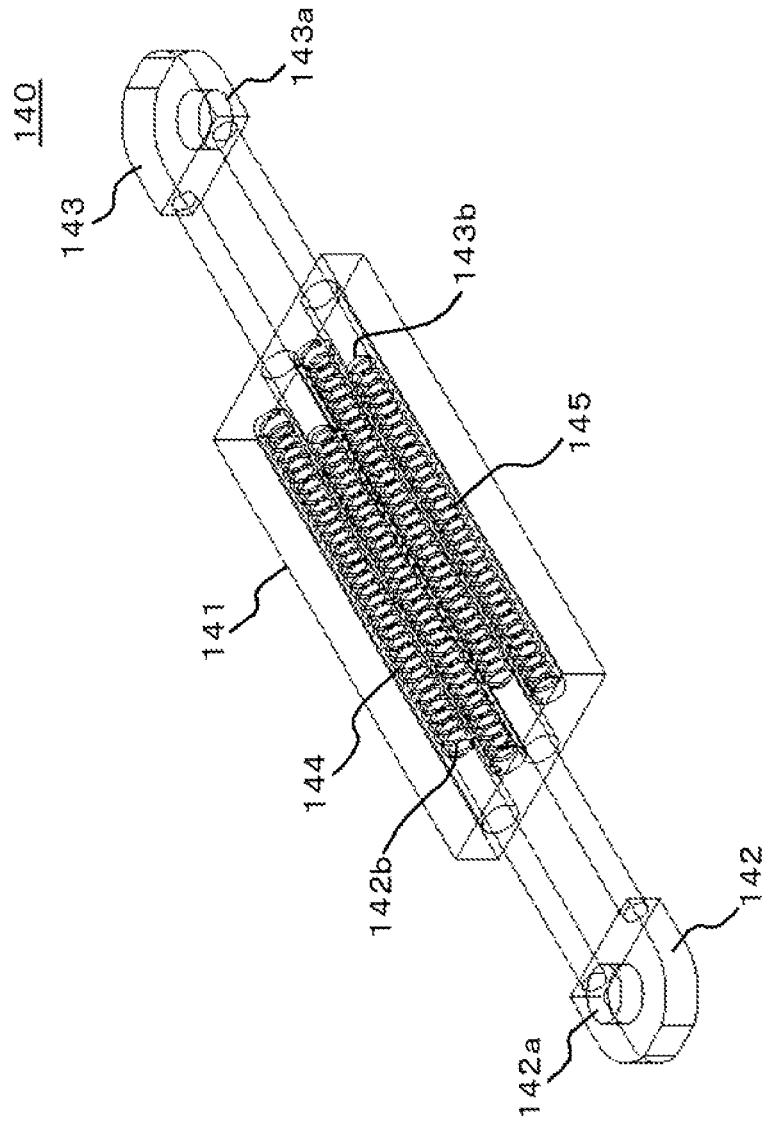
FIG. 11 is a perspective view schematically showing a configuration of an assist mechanism in the portable apparatus according to a conventional example.

It is to be noted that, in the conventional example (refer to FIG. 9 to FIG. 12), when compression springs (144 and 145 in FIG. 11) are in a contracted state (a state of (A) of FIG. 12) a load acting diagonally downwards at an angle of approximately 45° is generated, and when an intermediate point (point of (B) of FIG. 12) is passed by an operation done manually, the direction of the load that is acting is reversed as in (C) of FIG. 12 to automatically cause an extension, and a stop is made by a stopper not shown in the drawings, at a position of approximately 45° in a diagonally upward direction. At this time, in addition to the volume occupied by structural members (141, 142, and 143 in FIG. 11) of the compression springs (144 and 145 in FIG. 11), a spatial volume associated with movement, with a shape similar to a triangular form, becomes necessary. Above and below, small triangular shaped spaces remain, but in electronic devices such as a portable apparatus or the like, since other parts generally have a quadrangular shape or a round shape, a triangular shape is difficult to utilize effectively and becomes a non-usable region. As a result, in order to realize this type of assist structure, the volume occupied by the structural members, the spatial volume associated with movement, and, in addition, non-usable regions occurring due to the spatial volume associated with movement become necessary and largely impede miniaturization of the device.

According to the first example, a region through which the assist mechanism 40 passes has an approximately quadrangular shape, so that it is possible to arrange parts outside the region of the spatial volume associated with movement of the assist mechanism 40. As a result, it is possible to eliminate the non-usable regions or to get by with an extremely small non-usable region, and space can be used to the maximum. Furthermore, since the flexible cable 50 for connecting the upper and lower casings 10 and 20 can also be disposed in the same plane, it is possible to have a thin device. Moreover, since the compression springs 42 and 43 that have a large spring stroke are used, it is possible both to ensure durability and to have a large stroke, and in addition a thin device is possible. In addition, as a result of the abovementioned effects, it is possible to realize a slide assist mechanism that has both a large stroke and that enables a small sized and thin device.

It is to be noted that the first example has a configuration in which there are 2 of each of the first compression spring 42 and the second compression spring 43 in the assist mechanism 40, but clearly 1 thereof is possible or more than 1 thereof is also possible.

Modifications and adjustments of exemplary embodiments and examples are possible within the bounds of the entire disclosure (including the scope of the claims) of the present invention, and also based on fundamental technological concepts thereof. Furthermore, a wide variety of combinations and selections of various disclosed elements are possible within the scope of the claims of the present invention. That is, the present invention clearly includes every type of transformation and modification that a person skilled in the art can realize according to technological concepts and the entire disclosure including the scope of the claims.

EXPLANATION OF SYMBOLS

10, 110 upper casing
11, 111 display part
20, 120 lower casing
21, 121 key operation part
30, 31, 130 slide mechanism
30*a* groove portion
30*b*, 31*b* hole
31*a* slide portion
40 assist mechanism
41 holding case
41*a* first compression spring housing part
41*b* second compression spring housing part
41*c*, 41*d* stopper groove portion
42 first compression spring (elastic spring)
43 second compression spring (elastic spring)
44 first compression support member (first support member)
44*a* compression spring push-in step portion
44*b* retaining clasp
44*c* attachment support part
45 second compression support member (second support member)
45*a* compression spring push-in step portion
45*b* retaining clasp
45*c* attachment support part 50, 150 flexible cable
112 key operation part
140 assist mechanism
141 holding case
142 first slide support part
142a attaching part
142b spring support part
143 second slide support part
143a attaching part
143b spring support part
144 first compression spring
145 second compression spring

What is claimed is:

1. A portable apparatus, having a slide mechanism by which an upper casing can be made to slide with respect to a lower casing, said apparatus comprising:
   an assist mechanism, disposed between said upper casing and said lower casing, and assisting sliding of said upper casing, wherein
   said assist mechanism comprises:
   a first support member attached pivotably to said upper casing or to a member that is fixed to said upper casing;
   a second support member attached pivotably to said lower casing or to a member that is fixed to said lower casing;
   one or a plurality of first elastic springs that bias said first support member;
   one or a plurality of second elastic springs that bias said second support member; and
   a holding case that holds said first elastic spring(s) and said second elastic spring(s) in a serially arrayed state with a direction of extension and contraction of said first elastic spring(s) forming a prescribed angle to a direction of extension and contraction of said second elastic spring(s), said first support member being slidably inserted in the direction of extension and contraction of said first elastic spring(s), and said second support member being slidably inserted in the direction of extension and contraction of said second elastic spring(s).

2. The portable apparatus according to claim 1, wherein said first elastic spring(s) and said second elastic spring(s) are coil springs.

3. The portable apparatus according to claim 1, wherein said prescribed angle is 90°.

4. The portable apparatus according to claim 1, comprising: a flexible cable, disposed so as not to interfere with said assist mechanism between said upper casing and said lower casing where said assist mechanism is disposed, and also electrically connecting an electrical part inside said upper casing and an electrical part inside said lower casing.

5. The portable apparatus according to claim 1, wherein said holding case is configured to hold abreast and in parallel a plurality of said first elastic springs, and also to hold abreast and in parallel a plurality of said second elastic springs.

6. The portable apparatus according to claim 1, wherein said holding case comprises a guide mechanism that guides movement of said assist mechanism when said upper casing slides, at an intersection point of load force lines of said first elastic spring(s) and said second elastic spring(s).

7. The portable apparatus according to claim 1, wherein said first elastic spring comprises one elastic spring, and said second elastic spring comprises one elastic spring.

8. The portable apparatus according to claim 1, wherein said first and second elastic springs comprise two elastic springs, respectively.

* * * * *